(12) United States Patent
Griffin

(10) Patent No.: US 6,517,919 B1
(45) Date of Patent: *Feb. 11, 2003

(54) LAMINATE AND PULSE JET FILTER BAG

(75) Inventor: James W. Griffin, Lansdale, PA (US)

(73) Assignee: Donaldson Company, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,889

(22) Filed: Jul. 10, 1998

(51) Int. Cl.$^7$ .............................. B32B 5/18; B32B 5/22
(52) U.S. Cl. ........................ 428/36.1; 55/381; 55/521; 210/448; 210/452; 422/169; 422/171; 428/36.5; 428/334; 428/336; 428/340; 428/421
(58) Field of Search .............................. 428/34.1, 36.1, 428/36.5, 334, 336, 340, 448, 421; 55/381, 521; 210/448, 452; 422/169, 171

(56) References Cited

U.S. PATENT DOCUMENTS

| | | | | |
|---|---|---|---|---|
| 2,662,065 A | | 12/1953 | Berry | 260/29.6 |
| 4,031,283 A | | 6/1977 | Fagan | 428/280 |
| 4,129,139 A | * | 12/1978 | Powers | 135/3 E |
| 4,168,298 A | * | 9/1979 | Fitzgerald | 428/224 |
| 4,324,574 A | | 4/1982 | Fagan | 55/487 |
| 4,333,786 A | | 6/1982 | Civardi et al. | 156/306.6 |
| 4,877,683 A | | 10/1989 | Bragaw, Jr. et al. | 428/421 |
| 4,943,475 A | | 7/1990 | Baker et al. | 428/246 |
| 4,945,125 A | | 7/1990 | Dillon et al. | 527/427 |
| 4,983,434 A | | 1/1991 | Sassa | 428/36.2 |
| 4,988,540 A | | 1/1991 | Bragaw, Jr. et al. | 427/155 |
| 5,066,683 A | | 11/1991 | Dillon et al. | 521/54 |
| 5,096,473 A | | 3/1992 | Sassa et al. | 55/97 |
| 5,104,727 A | | 4/1992 | Wnenchak | 428/285 |
| 5,157,058 A | | 10/1992 | Dillon et al. | 521/134 |
| 5,296,287 A | | 3/1994 | Ribbans | 428/251 |
| 5,308,485 A | | 5/1994 | Griffin et al. | 210/232 |
| 5,362,553 A | | 11/1994 | Dillon et al. | 428/246 |
| 5,928,414 A | * | 7/1999 | Wnenchak et al. | 95/280 |

FOREIGN PATENT DOCUMENTS

| | | | |
|---|---|---|---|
| DE | 69409814 | * | 5/1998 |
| EP | 0 391 660 A2 | | 10/1990 |
| GB | 2141377 A | * | 12/1984 |
| JP | 59048150 | * | 3/1984 |
| WO | WO 89/07346 | * | 8/1989 |
| WO | WO 93/05960 | | 4/1993 |
| WO | WO 94/19029 | * | 9/1994 |

OTHER PUBLICATIONS

Product Information Sheet, "DuPont Teflon® FEP 120 fluoropolymer resin," 4 pgs. (date unknown).

* cited by examiner

Primary Examiner—Sandra M. Nolan
(74) Attorney, Agent, or Firm—Merchant & Gould P.C.

(57) ABSTRACT

A laminate product is provided. The laminate product includes a first layer of porous expanded polytetrafluoroethylene membrane, and a second layer of woven fabric of polytetrafluoroethylene containing yarn. The membrane preferably has an air permeability of at least 0.01 cfm/ft$^2$ at 0.5 inch water gauge, and a thickness of greater than about 0.5 mil. The woven fabric preferably has a weight of between about 15 ospy and about 30 ospy. The laminate product can be sewn to provide a filter bag for use in pulse jet filter applications.

33 Claims, 2 Drawing Sheets

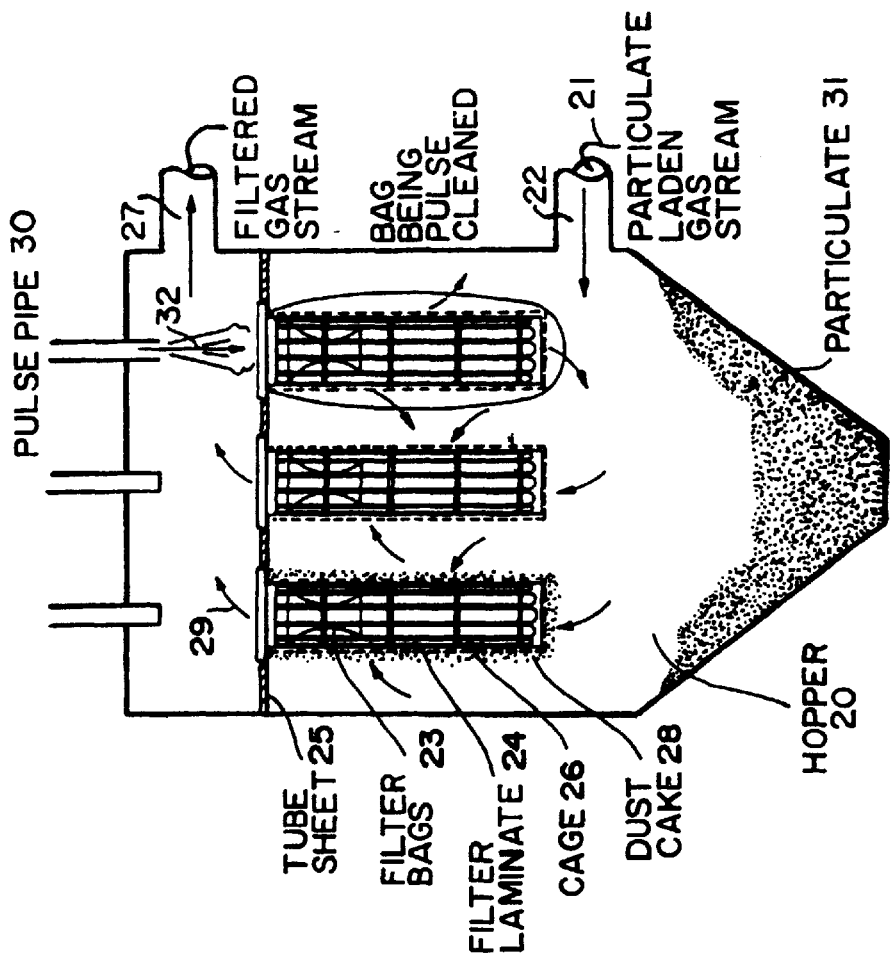
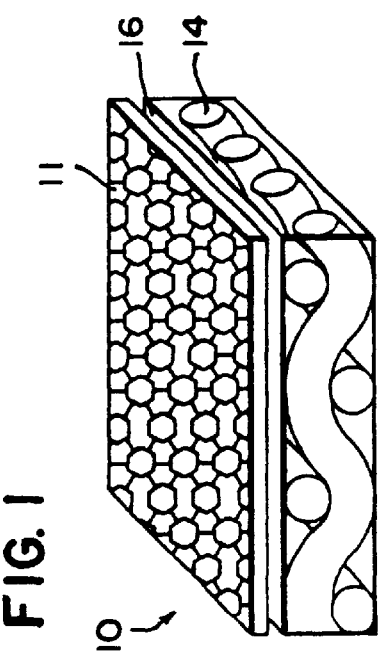

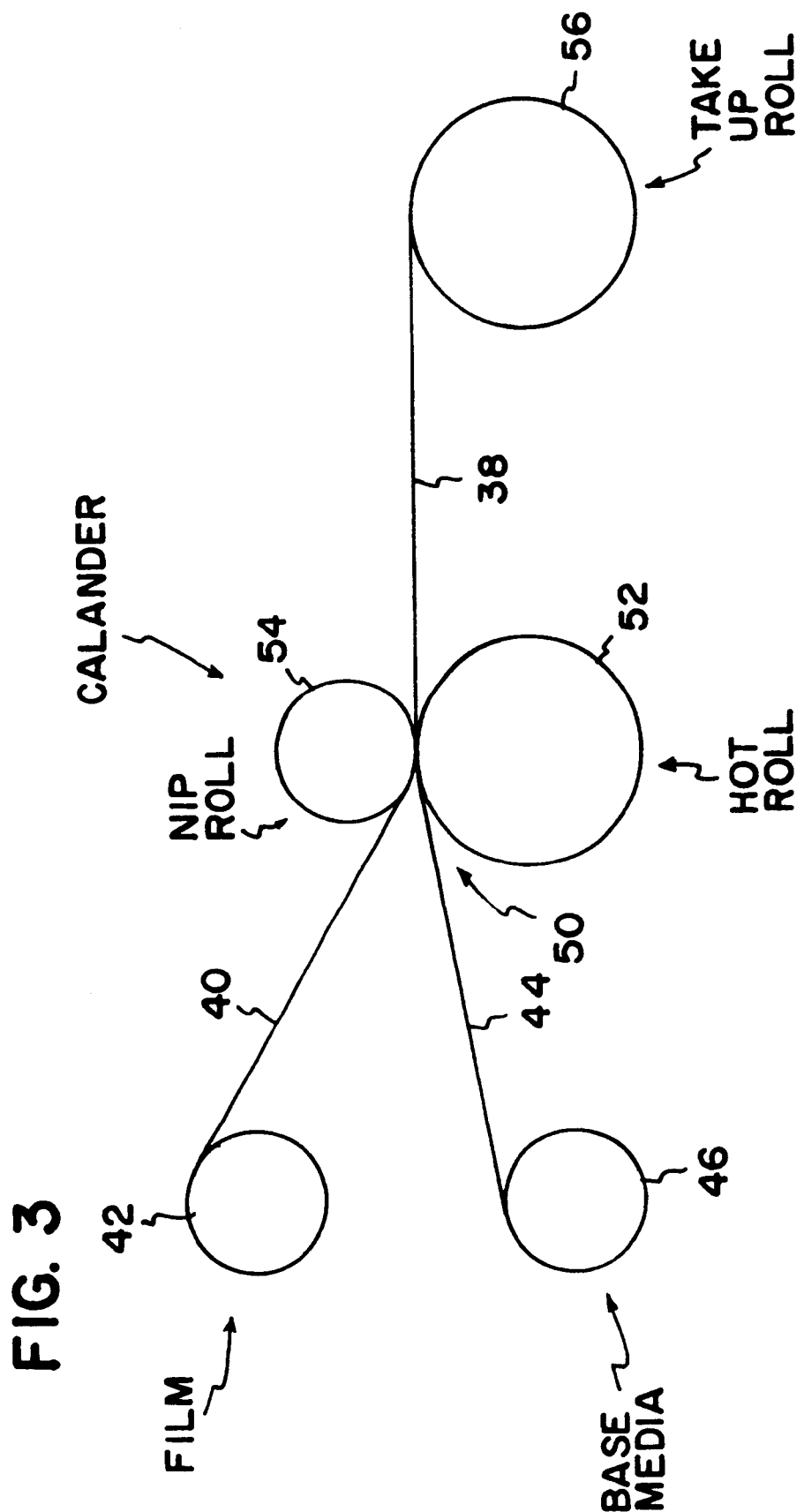

LAMINATE AND PULSE JET FILTER BAG

FIELD OF THE INVENTION

This invention relates to a laminate product, a pulse jet filter bag, and methods for manufacturing a laminate product and a pulse jet filter bag. In particular, this invention relates to a laminate product including a porous expanded polytetrafluoroetheylene membrane layer and a woven fabric including polytetrafluoroetheylene containing yarn layer.

BACKGROUND OF THE INVENTION

Fabric filter bags are often used for separating particulate impurities from industrial fluid streams. These filters tend to accumulate a particulate cake which is occasionally removed, or the filter is replaced. It is common in the industrial filtration market to characterize the type of filter bag by the method of cleaning. The most common types of cleaning techniques are reverse air, shaker and pulse jet. Reverse air and shaker techniques are considered low energy cleaning techniques. The reverse air technique is a gentle backwash of air on a filter bag which collects dust on the interior. The back wash collapses the bag and fractures dust cake which exits the bottom of the bag to a hopper. Shaker mechanisms clean filter cake that collects on the inside of a bag as well. The top of the bag is attached to an oscillating arm which creates a sinusoidal wave in the bag to dislodge the dust cake. Pulse jet cleaning techniques employs a short pulse of compressed air that enters the interior top portion of the filter. As the pulse cleaning air passes through the venturi it aspirates secondary air and the resulting air mass violently expands the bag and casts off the collected dust cake. The bag will typically snap right back to the cage support and go right back into service collecting particulate.

Of the three cleaning techniques the pulse jet is the most stressful on the filter media. In addition to withstanding the stresses provided during cleaning, the on-line pulse jet filter bag is generally subjected to higher volumetric airflow/cloth area ratios compared with reverse air and shaker filter bags.

Filter media often used in pulse jet filter bags include polytetrafluoroetheylene (PTFE), fiberglass, polyimides, polyesters, acrylics, and polypropylenes. When the pulse jet bag is used to filter high temperature industrial streams including oxidizing agents, acids or bases, there is a tendency for many of the filter medias to fail prematurely. PTFE is advantageous in its ability to withstand an environment including high temperatures and oxidizing agents.

Presently available PTFE filter media for use in pulse jet filter baghouse applications are based upon PTFE needlefelts. For example, U.S. Pat. No. 4,983,434 to Sassa describes a pulse jet filter bag prepared from a laminate of expanded porous polytetrafluoroetheylene membrane and polytetrafluoroetheylene felt reinforced with a woven scrim. Filters prepared from needlefelts of PTFE fiber are available. These felts typically weigh from 20–26 oz/yd$^2$ and are reinforced with woven scrim (2–6 oz/yd$^2$). The felts can be made up of staple fibers (usually 6.7 denier/filament, or 7.4 dtex/filament) which are 2–6 inches in length.

PTFE needlefelts tend to exhibit shrinkage when first exposed to high temperatures, and tend to stretch over time. Because of the shrinkage of PTFE needlefelts, they are often double heat set prior to use.

SUMMARY OF THE INVENTION

A laminate product which can be used in filter applications is provided by the present invention. The laminate product includes a first layer comprising porous expanded polytetrafluoroethylene membrane, and a second layer comprising woven fabric of polytetrafluoroethylene containing yarn. The porous expanded polytetrafluoroethylene membrane preferably has an air permeability of at least 0.01 cfm/ft$^2$ at 0.5 inch gauge, and a thickness of greater than about 0.5 mil according to ASTM D579-89 sec. 35. The woven fabric of polytetrafluoroethylene containing yarn preferably has a weight of between about 15 opsy and about 30 opsy. The polytetrafluoroethylene polymer of the first layer and the second layer can both be obtained from silicone treated PTFE.

The first layer and the second layer can be thermally bonded together, or bonded together using an adhesive. Preferable adhesives include fluorinated polymer adhesive, such as fluorinated ethylene propylene (FEP) copolymer, tetrafluoroethylene/perfluoropropylene copolymer, and polyvinylidene difluoride.

The woven fabric is preferably prepared from expanded polytetrafluoroethylene containing yarn having a size of between about 600 denier and about 2,400 denier. Preferably, the weight of the woven fabric is between about 18 opsy and about 23 opsy. The membrane preferably has a thickness of between about 1 mil and about 2.5 mil.

In order to function well in a pulse jet filter bag application, the laminate product should have an air permeability of between about 7 and about 20 cfm/ft$^2$ according to ASTM D737-75; a mullen burst strength of between about 600 and 1,000 lbs/in according to ASTM 3786; a tensile strength of between about 150 and about 500 lbs/in according to ASTM D579-89; a shrinkage of less than about 3% when heated to 500° F. for 2 hours; a flex greater than about 500,000 cycles according to ASTM D2176-63T; and an elongation of less than about 8% at 50 lbs. It should be appreciated that the laminate product can be used in both dry filter applications and liquid filter applications. In the case of liquid filter applications, it is preferable that the laminate product have an air permeability of between about 0.01 and about 7 cfm/ft$^2$ according to ASTM D73775.

A pulse jet filter bag is provided by the present invention. The pulse jet filter bag includes the laminate product having a first layer of porous expanded polytetrafluoroethylene membrane and a second layer of woven fabric of polytetrafluoroethylene containing yarn, wherein the laminate product is sewn together to provide a filter bag. Preferably, the laminate product is sewn using a feld seam to provide a filter bag which can be used in a pulse jet filter application.

A method for manufacturing a laminate product is provided by the present invention. The method includes steps of providing a first layer of expanded porous polytetrafluoroethylene membrane, providing a second layer of woven fabric of polytetrafluoroethylene containing yarn, and bonding the first layer and the second layer together. The first and second layer can be bonded either thermally at a temperature of at least about 500° F., or using an adhesive.

BRIEF DESCRIPTION OF THE DRAWINGS

FIG. 1 shows a preferred laminate product according to principles of the present invention;

FIG. 2 shows a schematic illustration of a filter bag house operation; and

FIG. 3 shows a schematic illustration of a method for manufacturing the laminate product of FIG. 1.

DETAILED DESCRIPTION OF THE INVENTION

A laminate product is provided which is useful in a pulse jet filter bag. The laminate product includes a porous expanded polytetrafluoroetheylene (PTFE) membrane and a woven fabric including polytetrafluoroethylene containing yarn. The porous expanded PTFE membrane can be referred to as the membrane, and the woven fabric of PTFE containing yarn can be referred to herein as the woven fabric. The membrane and the woven fabric are thermally bonded together or bonded with adhesive.

Porous expanded PTFE membrane includes commercially available PTFE membranes for industrial filtering applications and which can be prepared by a number of different known processes, but is preferably prepared by expanding polytetrafluoroetheylene as described in U.S. Pat. Nos. 4,945,125 to Dillon et al and U.S. Pat. No. 5,066,683 to Dillon et al., the entire disclosures of which are incorporated herein by reference. In general, the term porous expanded PTFE membrane is intended to include within its scope microporous PTFE and treated microporous PTFE, an example of which is silicone treated PTFE as described in U.S. Pat. Nos. 4,945,125 and 5,066,683. Porous expanded PTFE can additionally be prepared according to the techniques provided in U.S. Pat. Nos. 4,187,390; 4,110,392; and 3,953,566. By "porous," it is meant that the membrane has an air permeability of at least 0.01 cubic feet per minute per square foot (cfm/ft$^2$) at 0.5 inch water gauge. Air permeabilities of 300 cfm/ft$^2$ or more can be used. The pores are micropores formed by the nodes and fibrils of the expanded PTFE. The membrane may preferably have an air permeability of between about 7 and about 75 cfm/ft$^2$ at 0.5 inches water gauge, for use in gas stream filtration. Lower air permeability membranes are useful in liquid stream applications. Preferably, the membranes for use in liquid stream applications have an air permeability of between about 0.01 and about 7 cfm/ft$^2$.

Membranes which are preferably used according to the invention are those which can withstand the stress involved in a pulse jet filter bag when applied to the woven fabric according to the present invention. That is, the preferred membranes will resist cracking under normal use in a pulse jet filter bag application. In general, the membranes which can be used according to the invention can be characterized by a thickness which is greater than about 0.5 mil as determined according to ASTM D579-89 sec. 35 or ASTM D1777-64. It should be understood that the thickness of expanded PTFE membranes is difficult to precisely measure because the membrane has been expanded and the thickness across the membrane varies as a result of the stretching. Furthermore, the expanded film includes fibrils and nodes which effect the thickness, and the film is compressible. In general, the thickness of expanded PTFE membranes is often expressed in terms of ranges. Membrane having a thickness about 0.5 mil or less are generally characterized as light membranes. Preferably, the expanded PTFE membrane has a thickness of between about 1 mil and about 2 mil and is characterized as a medium weight membrane, and more preferably the expanded PTFE membrane has a thickness of between about 1.5 mil and about 2.5 mil and can be categorized as a heavy membrane. Expanded PTFE membranes which can be used in the present invention are available from Donaldson Company, Inc. of Bloomington, Minn. under the name Tetratex®.

The applicants discovered that by using a woven fabric which can be characterized as heavy and tightly woven, stress on the membrane is reduced without sacrificing air permeability features. It should be understood that a heavy woven fabric generally refers to a woven fabric having a weight of at least about 15 oz/yd$^2$ (ospy). If the fabric is lighter than 15 oz/yd , it is expected that the yarns will slide on themselves and stress the membrane. This is the problem expressed by U.S. Pat. No. 4,983,434 at column 2, lines 17–27. In addition, the woven fabric should not be so heavy that the laminate product is too difficult to clean in a pulse jet application, or so heavy that the permeability of the woven fabric is poor. It is expected that heavier weight woven fabrics require more energy in order to move the woven fabric in order to clean the filter bag. Preferably, the woven fabric has a weight which is no heavier than 30 opsy, and more preferably within the range of about 18 to about 23 opsy.

In providing the heavy and tightly woven fabric, it is desirable to use yarns which are as large as possible. It should be understood that while the weight of the yarn is expressed in terms of denier, the yarn may include plies of two or more lighter weight yarns to provide a heavier weight yarn. Heavy yarns are advantageous in order to withstand the stresses which occur in the cage of a pulse jet filter bag operation. In general, it is expected that the yarn which is woven into a fabric will have a size of between about 600 denier and about 2,400 denier. If the yarn weight is less than about 600 denier, it is expected that the woven fabric will not provide the desired level of stress resistance for pulse jet applications. If the yarn size is greater than about 2,400 denier, it is expected that the pic count of the woven fabric will decrease thereby decreasing the weight of the woven fabric and decreasing the air permeability of the woven fabric. Preferably, the yarn will have a weight of between about 1,000 and about 1,600 denier. A preferred yarn will have a weight of about 1,200 denier. Of course, two plies of 400 denier yarn can be combined to provide a 800 denier yarn for weaving. Similarly, two plies of 600 denier yarn can be combined to provide a 1,200 denier yarn for weaving.

The weave pattern can be adjusted depending on the desired permeability and weight of the woven fabric. Typical weave patterns which can be used for preparing the woven fabric of the invention include broken crow foot, 3×1 twill, 4×1 twill, and sateen. A preferred weave pattern is 3×1 twill.

The yarn used in preparing the woven fabric is a PTFE containing yarn. That is, the yarn includes at least about 50 percent, by weight, PTFE yarn or expanded PTFE yarn. The yarn can include a ply of PTFE and a ply of non-PTFE yarn such as fiberglass or polyphenyl sulfide. It should be appreciated that the warp and the filler yarns can be the same or different material. Preferably, both the warp and the filler yarns are PTFE containing yarns. More preferably, the warp and filler yarns are 100% PTFE or treated PTFE.

Yarns which can be used for preparing the woven fabric can be purchased under the name Profilen from Lenzing A. G. of Austria. Preferably, the yarn can be prepared from a film of expanded or non-expanded PTFE. For example, PTFE films can be prepared according to the techniques described in U.S. Pat. Nos. 4,945,125 and 5,066,683. Preferably, the film is prepared from microporous PTFE/silicone interpenetrating matrices. Alternatively, the film can be prepared according to U.S. Pat. Nos. 4,187,390; 4,110, 392; and 3,953,566. The resulting film can then be slit to provide the desired yarn thickness. The yarn can be provided as a flat yarn or shaped to provide arounded yarn. The resulting yarn is then woven to provide the woven fabric. Techniques for weaving fabrics are well known.

The membrane and the woven fabric are laminated together. Preferably, the laminate and the woven fabric are thermally bonded together at a temperature of between about 500° F. and about 700° F. to provide sufficient adhesion. Preferably the processing temperature is about 700° F.

Alternatively, the membrane and the woven fabric can be bonded together using a conventional adhesive for bonding PTFE materials. Exemplary adhesives include fluorinated polymer adhesive, such as fluorinated ethylene propylene (FEP) copolymer, tetrafluoroethylene/perfluoropropylene copolymer, and polyvinylidene difluoride. When using a conventional adhesive, it is desirable to heat the adhesive to a temperature sufficient to allow the adhesive to bond to both the membrane and the woven fabric. In the case of FEP adhesive, it is desirable to heat to a temperature of about 600° F. It should be appreciated that when using an adhesive, such as an FEP adhesives, the bonding temperature can be lower than generally required for thermally bonding the membrane and woven fabric together.

The laminate product of the invention preferably has certain physical properties which make it advantageous for use in a pulse jet filter bag. The filter can be used for either dry filtration or liquid filtration. Preferably, the permeability of the laminate product for dry filtration is between about 7 and about 20 cfm/ft$^2$ according to ASTM D737-75, and the permeability for liquid filtration is between about 0.01 and about 7 cfm/ft$^2$ according to ASTM D737-75. The air permeability is obtained by subjecting the sample to be tested to an air flow and noting the air velocity that is needed to register 0.5 inches on a pressure water gauge. Preferably, the mullen burst strength is between about 600 and about 1,000 lbs/in$^2$, and preferably between about 800 and about 900 lbs/in$^2$ according to ASTM 3786. The tensile strength of the woven laminate is preferably between about 150 and about 500 lbs/in according to ASTM D579-89. More preferably, the tensile strength is between about 200 and about 500 lbs/in. The shrinkage of the laminate product should be less than about 3% when heated to 500° F. for 2 hours. The MIT flex (folding endurance) is preferably greater than about 500,000 cycles according to ASTM D2176-63T. The elongation of the woven fabric is preferably less than about 8% at 50 lbs. Applicants have found that the laminate product of the invention provides improved properties, as described above, compared to commercially available PTFE needlefelt filter products.

Referring to FIG. 1, a preferred laminate product is provided at reference numeral 10. The laminate product 10 includes a membrane 12 and a woven fabric 14. Preferably, the membrane 12 is a membrane of porous expanded PTFE, and the woven fabric 14 includes PTFE containing yarn. The membrane 12 and the woven fabric 14 are adhered together at the laminate boundary 16.

The laminate product of the invention is useful in pulse jet filter baghouse assemblies, and provides good pulse jet cleaning capabilities. The use of PTFE in the woven fabric provides good heat resistance and chemical resistance. Use of expanded porous PTFE in the yarn provides increased strength and stability compared with non-expanded PTFE containing yarn. Use of heavy PTFE woven fabric provides a durable material that can flex easily, yet withstand the stress caused by pulse jet cleaning. These stresses are of two general types. One type of stress is caused by the sudden expansion during pulse jet cleaning. The other type of stress is caused by sudden collapsing of the bag against its rigid support members.

The use of the porous expanded PTFE membrane provides the desired air flow rates, i.e., high permeability, which is advantageous for filtration assemblies. The small size of the pores, and the fine fibril network of the expanded PTFE membrane prevents particulate impurities in the filtration stream from penetrating through the filter assembly. The beneficial permeability properties of PTFE membranes as a filter material is widely understand and appreciated in the art.

Referring now to FIG. 2, a pulse jet cleaning sequence is shown for a dry filtration application. Inside hopper 20, particulate laden gas stream 21 enters the hopper at inlet 22 and passes through filter bags 23 made of a laminate product 24 according to the present invention. Tube sheet 25 inside hopper 20 prevents the gas stream from bypassing the filter bags 23. The filter bags 23 are kept open by supporting cage 26. The gas stream, after passing through the bag and out bag exit 29, exits the clean air compartment at outlet 27. In operation, particulate forms a dust cake 28 on the outside of the filter bag, as shown in the bag on the left of the figure. On cleaning to remove the filter cake, air from pulse pipe 30 enters the bag. This pulse of air 32 expands the bag loosening the dust cake and thus causing particulate 31 to collect at the bottom of hopper 20. As seen in the bag on the right of the figure, the pulse jet causes the filter bag to expand. The repeated expansion and contraction of the bag against its support struts causes wear on the bag.

Now referring to FIG. 3, a preferred method for providing the laminate product 38 is provided according to the present invention. The method can be characterized as a calendaring technique. In general, a supply of membrane 40 is provided on a roll 42, and a supply of woven fabric 44 is provided on a roll 46. The membrane 40 and woven fabric 44 are fed to a laminating station 50 where a hot roll 52 heats the woven fabric 44 to a temperature which allows bonding to the laminate 40. A nip roll 54 is provided for maintaining pressure between the laminate 40 and the woven fabric 44.

In general, the hot roll 52 should be kept at a temperature of at least about 450° F., and more preferably between about 575° F. and about 700° F. The pressure provided by the nip roll 54 should be greater than about 20 psi and is preferably between about 60 psi and about 80 psi.

The laminate product 38 is taken up by the take up roll 56 and stored for subsequent use. Preferably, the distance between the take up roll 56 and the hot roll 52 is sufficient to allow the laminate product 38 to cool. In general, the distance can be about 3 feet when the method is conducted in a room temperature environment.

I claim:

1. A laminate product comprising:
   (a) a first layer comprising porous expanded polytetrafluoroethylene membrane having an air permeability of at least 0.01 cubic feet per square foot at 0.5 inch water gauge, and a thickness of greater than about 0.5 mil; and
   (b) a second layer comprising woven fabric of polytetrafluoroethylene containing yarn, wherein the woven fabric has a weight of between about 15 opsy and about 30 opsy;
   wherein the porous expanded polytetrafluoroethylene membrane is provided adjacent to woven fabric of polytetrafluoroethylene containing yarn and the porous expanded polytetrafluoroethylene membrane is thermally bonded to the woven fabric of polytetrafluoroethylene containing yarn.

2. A laminate product according to claim 1, wherein the polytetrafluoroethylene containing yarn comprises expanded polytetrafluoroethylene containing yarn having a size of between about 600 denier and about 2,400 denier.

3. A laminate product according to claim 1, wherein the woven fabric has a weight of between about 18 opsy and about 23 opsy.

4. A laminate product according to claim 1, wherein the membrane has a thickness of between about 1 mil and about 2 mil.

5. A laminate product according to claim 1, wherein the membrane has a thickness of between about 1.5 mil and about 2.5 mil.

6. A laminate product according to claim 1, wherein the laminate has:
   an air permeability of between about 7 and about 20 cfm/ft$^2$ according to ASTM D737-75;
   a mullen burst strength of between about 600 and about 1,000 lbs/in$^2$ according to ASTM 3786;
   a tensile strength of between about 150 and about 500 lbs/in according to ASTM D579-89;
   a shrinkage of less than about 3% when heated to 500° F. for 2 hours;
   a flex greater than about 500,000 cycles according to ASTM D2176-63T; and
   an elongation of less than about 8% at 50 lbs.

7. A laminate product according to claim 1, wherein the first layer and the second layer are thermally bonded together.

8. A laminate product according to claim 1, wherein the porus expanded polytetrafluoroethylene containing yarn comprises silicone treated PTFE.

9. A laminate product according to claim 1, wherein the polytetrafluoroethylene containing yarn comprises silicone treated PTFE.

10. A pulse jet filter bag comprising:
    a laminate product sewn together via a feld seam to provide a bag, said laminate product comprising:
    (a) a first layer comprising expanded porous polytetrafluoroethylene membrane having an air permeability of at least 0.01 cubic feet per square foot at 0.5 inch water gauge, and a thickness of greater than about 0.5 mil; and
    (b) a second layer comprising woven fabric of polytetrafluoroethylene containing yarn, wherein the woven fabric has a weight of between about 15 opsy and about 30 opsy;
    wherein the porous expanded polytetrafluoroethylene membrane is provided adjacent the woven fabric of polytetrafluoroethylene containing yarn and the porous expanded polytetrafluoroethylene membrane is thermally bonded to the woven fabric of polytetrafluoroethylene containing yarn.

11. A pulse jet filter bag according to claim 10, wherein the polytetrafluoroethylene containing yarn comprises expanded polytetrafluoroethylene containing yarn having a size of between about 600 and 2,400 denier.

12. A pulse jet filter bag according to claim 10, wherein the woven fabric has a weight of between about 18 opsy and about 23 opsy.

13. A pulse jet filter bag according to claim 10, wherein the membrane has a thickness of between about 1 mil and about 2 mil.

14. A pulse jet filter bag according to claim 10, wherein the membrane has a thickness of between about 1.5 mil and about 2.5 mil.

15. A pulse jet filter bag according to claim 10, wherein the laminate has a permeability of between about 8 and about 16 cfm according to ASTM B737-75.

16. A method for manufacturing a laminate product, said method comprising steps of:
    (a) providing a first layer comprising expanded porous polytetrafluoroethylene membrane having an air permeability of at least 0.01 cubic feet per square foot at 0.5 inch water gauge, and a thickness of greater than about 0.5 mil;
    (b) providing a second layer comprising woven fabric of polytetrafluoroethylene containing yarn, wherein the woven fabric has a weight of between about 15 opsy and about 30 opsy; and
    (c) thermally bonding the expanded porous polytetrafluoroethylene membrane to the woven fabric of polytetrafluoroethylene containing yarn so that the porous expanded polytetrafluoroethylene membrane is adjacent to the woven fabric of polytetrafluoroethylene containing yarn.

17. A method for manufacturing a laminate product according to claim 16, wherein the step of bonding comprises thermally bonding at a temperature of at least about 500° F.

18. A laminate product comprising:
    (a) a first layer comprising porous expanded polytetrafluoroethylene membrane having an air permeability of at least 0.01 cubic feet per square foot at 0.5 inch water gauge, and a thickness of greater than about 0.5 mil;
    (b) a second layer comprising woven fabric of polytetrafluoroethylene containing yarn, wherein the woven fabric has a weight of between about 15 opsy and about 30 opsy; and
    (c) fluorinated polymer adhesive provided between the porous expanded polytetrafluoroethylene membrane and the woven fabric of polytetrafluoroethylene containing yarn and adhering the porous expanded polytetrafluoroethylene membrane to the woven fabric of polytetrafluoroethylene containing yarn.

19. A laminate product according to claim 18, wherein the polytetrafluoroethylene containing yarn comprises expanded polytetrafluoroethylene containing yarn having a size of between about 600 denier and about 2,400 denier.

20. A laminate product according to claim 18, wherein the woven fabric has a weight of between about 18 opsy and about 23 opsy.

21. A laminate product according to claim 18, wherein the membrane has a thickness of between about 1 mil and about 2 mil.

22. A laminate product according to claim 18, wherein the membrane has a thickness of between about 1.5 mil and about 2.5 mil.

23. A laminate product according to claim 18, wherein the laminate has:
    an air permeability of between about 7 and about 20 cfm/ft$^2$ according to ASTM D737-75;
    a mullen burst strength of between about 600 and about 1,000 lbs/in$^2$ according to ASTM 3786;
    a tensile strength of between about 150 and about 500 lbs/in according to ASTM D579-89;
    a shrinkage of less than about 3% when heated to 500° F. for 2 hours;
    a flex greater than about 500,000 cycles according to ASTM D2176-63T; and
    an elongation of less than about 8% at 50 lbs.

24. A laminate product according to claim 18, wherein the porous expanded polytetrafluoroethylene membrane comprises silicone treated PTFE.

25. A laminate product according to claim 18, wherein the polytetrafluoroethylene containing yarn comprises silicone treated PTF .

26. A pulse jet filter bag comprising:
    a laminate product sewn together via a feld seam to provide a bag, said laminate product comprising:

(a) a first layer comprising expanded porous polytetrafluoroethylene membrane having an air permeability of at least 0.01 cubic feet per square foot at 0.5 inch water gauge, and a thickness of greater than about 0.5 mil;

(b) a second layer comprising woven fabric of polytetrafluoroethylene containing yarn, wherein the woven fabric has a weight of between about 15 opsy and about 30 opsy; and (c) fluorinated polymer adhesive provided between the porous expanded polytetrafluoroethylene membrane and the woven fabric of polytetrafluoroethylene containing yarn and adhering the porous expanded polytetrafluoroethylene membrane to the woven fabric of polytetrafluoroethylene containing yarn.

27. A pulse jet filter bag according to claim 26, wherein the polytetrafluoroethylene containing yarn comprises expanded polytetrafluoroethylene containing yarn having a size of between about 600 and 2,400 denier.

28. A pulse jet filter bag according to claim 26, wherein the woven fabric has a weight of between about 18 opsy and about 23 opsy.

29. A pulse jet filter bag according to claim 26, wherein the membrane has a thickness of between about 1 mil and about 2 mil.

30. A pulse jet filter bag according to claim 26, wherein the membrane has a thickness of between about 1.5 mil and about 2.5 mil.

31. A pulse jet filter bag according to claim 26, wherein the laminate has a permeability of between about 8 and about 16 cfm.

32. A method for manufacturing a laminate product, said method comprising steps of:

(a) providing a first layer comprising expanded porous polytetrafluorethylene membrane having an air permeability of at least 0.01 cubic feet per square foot at 0.5 inch water gauge, and a thickness of greater than about 0.5 mil;

(b) providing a second layer comprising woven fabric of polytetrafluorethylene containing yarn, wherein the woven fabric has a weight of between about 15 opsy and about 30 opsy; and (c) adhesively bonding the expanded porous polytetrafluorethylene membrane to the woven fabric of polytetrafluorethylene containing yarn by using fluorinated polymer adhesive that bonds the porous expanded polytetrafluorethylene membrane to the woven fabric of polytetrafluorethylene containing yarn.

33. A method for manufacturing a laminate product according to claim 32, wherein the adhesive comprises fluorinated polymer adhesive.

* * * * *